June 6, 1939.  F. H. STROUP  2,161,642
DISTRIBUTING VALVE
Filed April 10, 1937
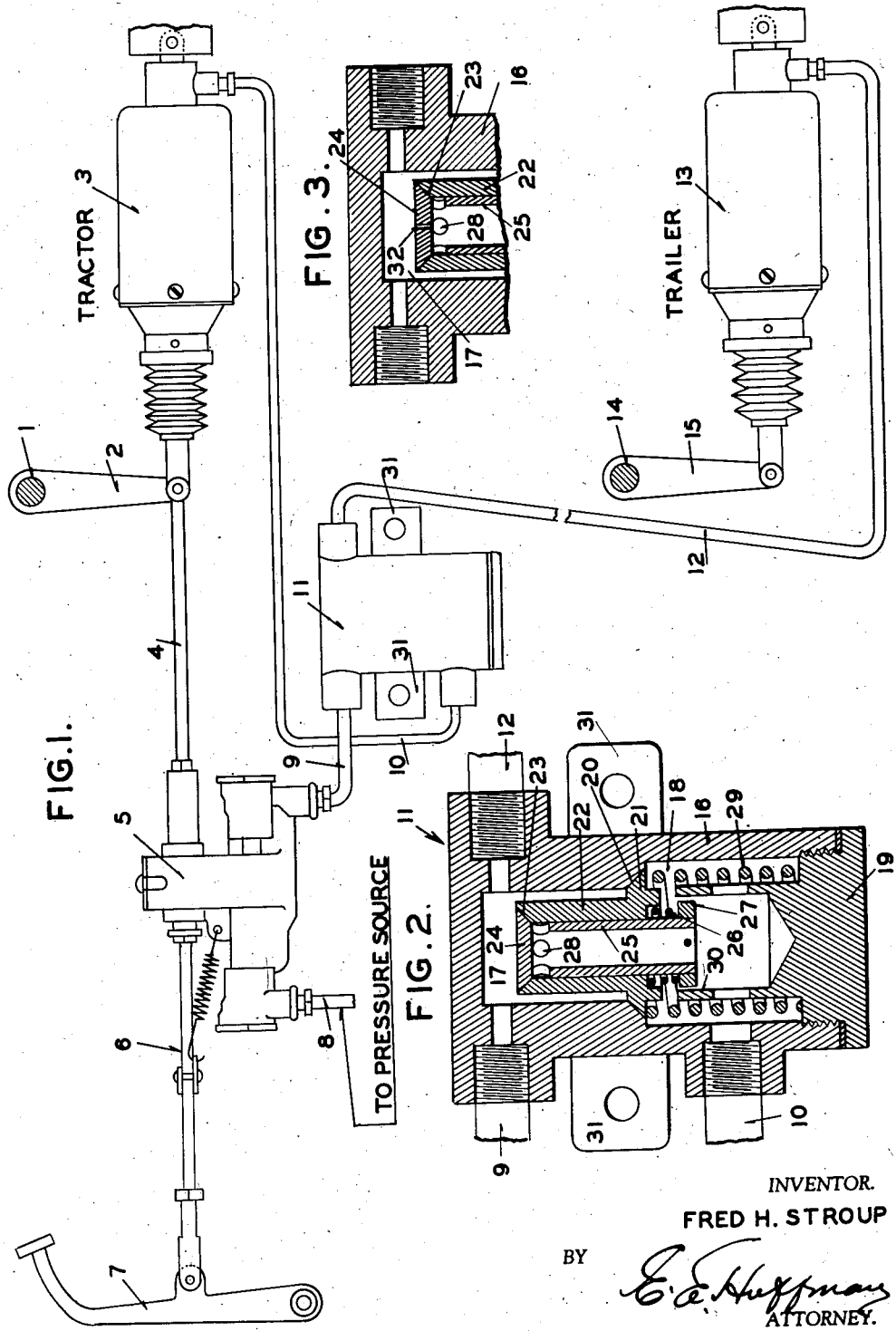
INVENTOR.
FRED H. STROUP
BY
*E. E. Huffman*
ATTORNEY.

Patented June 6, 1939

2,161,642

UNITED STATES PATENT OFFICE 2,161,642

DISTRIBUTING VALVE

Fred H. Stroup, Kirkwood, Mo., assignor to Wagner Electric Corporation, St. Louis, Mo., a corporation of Delaware Application April 10, 1937, Serial No. 136,033

2 Claims. (Cl. 277—45)

My invention relates to fluid-actuated braking mechanisms and more particularly to an improved valve for controlling the application of fluid pressure to the several power-operated units, a specific application thereof being the controlling of the power-operated units employed on the braking mechanism of combined tractor and trailer vehicles of either the semi-trailer or full trailer type.

One of the objects of my invention is to provide a braking mechanism having a plurality of power-operated units with a distributing valve which will permit one or more of said units to be operated by fluid pressure prior to the operation of the other or others of said units.

Another object of my invention is to produce a combined junction block and distributing valve for a fluid-operated brake system which can be easily and economically embodied in brake systems already being employed on vehicles or in brake systems designed for original equipment or replacement.

Other objects of my invention will become apparent from the following description taken in connection with the accompanying drawing in which Figure 1 is a schematic view of a fluid pressure actuated brake system for a tractor and trailer combination vehicle in which is embodied my combined junction block and distributing valve; Figure 2 is a cross-sectional view of the junction block and valve; and Figure 3 is a cross-sectional view showing a slight modification.

Referring to the drawing, the reference character 1 indicates the cross shaft of a vehicle braking system which, in the illustration, is mounted on the tractor of a tractor-trailer combination and to this cross shaft is secured an arm 2 whereby the brake system may be actuated by a fluid pressure motor 3. The arm 2 also has connected thereto a rod 4 secured to the casing of an application and release valve 5 of the "follow up" type which is controlled by a rod 6 connected to the brake pedal 7. The inlet of the valve is in communication with a source of pressure by a conduit 8 and the outlet thereof is in communication with fluid motor 3 by conduits 9 and 10 between which is my combined junction block and distributing valve 11. Also connected to outlet conduit 9 through the junction block and distributing valve 11 is a conduit 12 leading to the fluid pressure motor 13 which is mounted on the trailer of the tractor-trailer combination and is adapted to actuate the cross shaft 14 of the trailer braking system by means of an arm 15 secured to the cross shaft. Braking apparatus embodying the features mentioned, with the exception of the distributing valve, is well known and it is unnecessary to describe it more in detail. When it is desired to apply the brakes on the tractor and trailer, pedal 7 is actuated and, as a result of a limited relative movement between rods 4 and 6, valve 5 is operated to admit fluid under pressure from the source to the fluid motors 3 and 13. Movement of arm 2 by motor 3 causes the valve casing of valve 5 to "follow up" the movement of rod 6 and shut off the pressure in a well-known manner. Release of the brake pedal opens the exhaust port of valve 5 and releases the air pressure to atmosphere. In the event of failure of the source of fluid pressure, the tractor brakes can be manually applied by the brake pedal through rods 4 and 6 after the relative movement between rods 4 and 6 (provided for operating valve 5) has been taken up.

The combined junction block and distributing valve 11 comprises a casing 16 in which are two intercommunicating chambers 17 and 18 formed by bores of different diameters, the larger of which is closed by a plug 19. The chamber 17 has connected thereto the conduits 9 and 12, and chamber 18 has connected thereto the conduit 10. The portion of the wall of the casing between chambers 17 and 18 is provided with a valve seat 20 which cooperates with a valve element 21 having a hollow stem 22 extending into chamber 17. On the end of this stem is a valve seat 23 and cooperating therewith is a valve element 24 guided in valve stem 22 by a hollow valve stem 25. The valve element 24 is normally held seated by a very weak spring 26 interposed between a collar 27 on its end and valve element 21, and when valve element 24 is unseated, communication through valve stem 25 is permitted by holes 28 in the stem. The valve element 21 is normally biased to closed position by a relatively strong coil spring 29 which is interposed between it and plug 19, the plug having a perforated cylindrical extension 30 for guiding the spring and also to act as a stop for limiting the extent of opening movement of valve element 21. The valve casing may be secured to a suitable support by means of the attaching lugs 31.

With the combined junction block and distributing valve embodied in the braking system in the manner indicated, fluid actuating motor 13 for the trailer brakes will always be moved to brake applying position when control valve 5 is opened to apply fluid under pressure to motors 3 and 13 because conduits 9 and 12 are in direct communication with each other through chamber 17. When the fluid pressure in chamber 17 reaches a predetermined value, valve element 21 will be unseated against the action of spring 29 and fluid motor 3 on the tractor will be operated. When valve element 21 is unseated, fluid will flow from chamber 17 to chamber 18 as long as the pressure in chamber 17 is sufficiently greater than that in chamber 18 to overcome the action of spring 29. After the pressures in chambers 17 and 18 begin to equalize and as soon as the pressure differential is less than that necessary to hold valve element 21 unseated, it will close under the action of its spring. During application of the brakes, valve element 24 will always remain seated due to the pressure in chamber 17 being greater than that in chamber 18. When it is desired to exhaust the fluid motors by opening the exhaust port of control valve 5, valve 24 will become unseated due to the drop in pressure in chamber 17. This will occur immediately because of the weakness of spring 26 and, therefore, the air under pressure in the two motors 3 and 13 will be released almost simultaneously.

From the foregoing, it is seen that the trailer brakes will always be applied first when the control valve is operated, which is the desirable operation of the tractor and trailer brakes to prevent "jackknifing" of the vehicles which would be possible if the tractor brakes were applied first. It has been found in practice that by setting spring 29 so that valve 21 will open under approximately ten pounds of pressure in chamber 17, the proper sequence of application of the trailer and tractor brakes is secured although it is to be understood that this setting may be varied as desired in order to insure that the trailer brakes are applied first.

If it is desired to positively insure that the pressures in the chambers equalize after the brakes have been applied and held so and the valve element 24 has seated, a restricted passage may be provided between the chambers. An example of such a passage is shown in Figure 3 where the valve element 24 has a restricted passage 32 therethrough. This passage should be small enough so that upon initial application of pressure by control valve 5, the valve element 21 will still function in the manner intended. The passage 32 also insures that all of the air under pressure in chamber 18 and fluid motor 3 will be completely exhausted therefrom when the control valve 5 is moved to exhaust the air from the braking system.

Being aware of the possibility of modifications in the particular structure herein described without departing from the fundamental principles of my invention, I do not intend that its scope be limited except as set forth by the appended claims.

Having fully described my invention, what I claim as new and desire to secure by Letter Patent of the United States is:

1. In valve mechanism, a member provided with two bores of different diameters forming a pair of chambers, the bore of smaller diameter being provided with an inlet and an outlet and the bore of larger diameter being provided with an outlet, a closure plug for the larger bore, means forming a valve seat on said member at the junction of said bores, a valve element cooperating with said seat and movable off the seat in a direction toward the plug, said valve element being provided with a passage and a valve seat thereon associated with the passage, a second valve element cooperating with the last named seat for controlling said passage and movable as a unit with the first named valve element when the latter is unseated, said second valve element being movable off its seat in a direction opposite to the direction the first named valve element must be moved to be unseated, a light spring for biasing the second valve element on its seat, a relatively strong coil spring interposed between the first named valve element and the plug for biasing said valve element to closed position, and means carried by the plug for guiding the coil spring and also acting as a stop for limiting the extent of opening of the first named valve element.

2. A combination junction block and distribution valve mechanism comprising a casing having an inlet and an outlet at one end and a second outlet at the other end, said casing being provided with a centrally positioned valve seat, a valve element cooperating with the valve seat and movable off said seat in a direction toward the end of the casing provided with the second outlet, a spring interposed between the valve element and the end of the casing for biasing the valve element to closed position, said valve element being provided with a passage therethrough and with a hollow extension having a valve seat at its end, a second valve element cooperating with the valve seat on the extension and provided with a hollow stem perforated adjacent the valve element and extending through the extension and the passage in the first named valve element and slidably guided by the extension, said second named valve element being movable off its seat in a direction opposite to the direction the first named valve element must be moved to be unseated and also movable as a unit with said first named valve element when the latter is unseated, means forming a shoulder on the end of the stem and spaced from the valve element, and a spring interposed between said shoulder and the first named valve element for biasing the second named valve element to closed position.

FRED H. STROUP.